United States Patent
Stanley

[11] Patent Number: 6,021,863
[45] Date of Patent: Feb. 8, 2000

[54] SEAT WEIGHT SENSOR USING FLUID FILLED TUBING

[75] Inventor: James G. Stanley, Novi, Mich.

[73] Assignee: Automotive Systems Laboratory, Inc., Farmington Hills, Mich.

[21] Appl. No.: 09/003,746

[22] Filed: Jan. 7, 1998

Related U.S. Application Data

[60] Provisional application No. 60/065,986, Nov. 17, 1997.

[51] Int. Cl.[7] .................................................. B60K 28/00
[52] U.S. Cl. ..................... 180/273; 280/735; 297/DIG. 3
[58] Field of Search .................................. 180/273, 271; 280/735, 734; 297/DIG. 3, 199; 73/37, 700; 340/667

[56] References Cited

U.S. PATENT DOCUMENTS

| | | | |
|---|---|---|---|
| 1,969,929 | 8/1934 | Heden | 297/DIG. 3 |
| 3,670,119 | 6/1972 | Gebhardt et al. | 200/52 |
| 4,022,146 | 5/1977 | Sadler | 115/76 |
| 4,360,071 | 11/1982 | Dyck | 177/208 |
| 4,957,286 | 9/1990 | Persons, II et al. | 272/73 |
| 5,164,709 | 11/1992 | Lamberty et al. | 340/667 |
| 5,232,243 | 8/1993 | Blackburn et al. | 280/732 |
| 5,481,078 | 1/1996 | Asche | 200/85 A |
| 5,529,377 | 6/1996 | Miller | 297/284.6 |
| 5,904,216 | 5/1999 | Anahid et al. | 180/273 |

Primary Examiner—Christopher P. Ellis
Attorney, Agent, or Firm—Lyon, P.C.

[57] ABSTRACT

A hydrostatic weight sensor comprises a continuous flexible sensing tube incorporated within the seat. A fluid is contained therein and a pressure sensor is operatively coupled thereto. The continuous flexible sensing tube may be arranged in a spiral or serpentine pattern, or comprise a plurality of segments each in fluid communication with a central port. A load applied to the seat causes the continuous flexible sensing tube to deform, thereby increasing the pressure of the fluid contained therein. A signal processor calculates the weight of the occupant from the pressure signal, and controls a safety restraint system responsive to the weight measurement.

15 Claims, 2 Drawing Sheets

SEAT WEIGHT SENSOR USING FLUID FILLED TUBING

CROSS-REFERENCE TO RELATED APPLICATIONS

The instant application claims the benefit of U.S. Provisional Application Ser. No. 60/065,986 filed on Nov. 17, 1997.

Co-pending U.S. Application Ser. No. 08/933,701, hereinafter "Application ASL-157-US", entitled "Seat Weight Sensor Having Fluid Filled Bladder", filed on Dec. 18, 1997 claiming benefit of U.S. Provisional Application Ser. No. 60/032,380 filed on Dec. 19, 1996, and assigned to the assignee of the instant invention discloses a hydrostatic weight sensor comprising a fluid filled bladder and a pressure sensor for sensing the weight of an occupant in a vehicle seat for controlling a safety restraint system. Application ASL-157-US also discloses a load distributor for distributing loads across the load bearing surface of the hydrostatic weight sensor. Application ASL-157-US and U.S. Provisional Application Ser. No. 660/032,380 are incorporated herein by reference.

Co-pending U.S. Application Ser. No. 09/003,672, hereinafter "Application ASL-161-US", entitled "Automotive Seat Weight Sensing System", filed on Jan. 7, 1998 claiming benefit of U.S. Provisional Application Ser. No. 60/034,018 filed on Jan. 8, 1997, and assigned to the assignee of the instant invention discloses a seat weight sensing system comprising a plurality of hydrostatic weight sensors each of which is in accordance with Application ASL-157-US.

Co-pending U.S. Application Ser. No. 09/003,870, hereinafter "Application ASL-163-US", entitled "Vehicle Seat Sensor Having Self-Maintaining Air Bladder", filed on Jan. 7, 1998 claiming benefit of U.S. Provisional Application Ser. No. 60/035,343 filed on Jan. 16, 1997, and assigned to the assignee of the instant invention discloses an apparatus for automatically maintaining the supply of sensing fluid in a hydrostatic weight sensor.

Co-pending U.S. Application Ser. No. 09/003,857, hereinafter "Application ASL-185-US", entitled "Seat Weight Sensor Having Self-Regulating Fluid Filled Bladder", filed on Jan. 7, 1998 claiming benefit of U.S. Provisional Application Ser. No. 60/058,086 filed on Sep. 5, 1997, and assigned to the assignee of the instant invention discloses a hydrostatic weight sensor having a means for automatically regulating the amount of sensing fluid therein.

Co-pending U.S. Application Ser. No. 09/003,868, hereinafter "Application ASL-186-US", entitled "Seat Weight Sensor with Means for Distributing Loads", filed on Jan. 7, 1998 claiming benefit of U.S. Provisional Application Ser. No. 60/058,084 filed on Sep. 5, 1997, and assigned to the assignee of the instant invention discloses a load distributor for distributing sensed load across the load bearing surface of a hydrostatic weight sensor. Application ASL-186-US and U.S. Provisional Application Ser. No. 60/058,084 are incorporated herein by reference.

Co-pending U.S. Application Ser. No. 09/003,673, hereinafter "Application ASL-187-US", entitled "Seat Weight Sensor Having Self-Regulating Fluid Filled Bladder", filed on Jan. 7, 1998 claiming benefit of U.S. Provisional Application Ser. No. 60/058,119 filed on Sep. 5, 1997, and assigned to the assignee of the instant invention discloses a hydrostatic weight sensor having a means for automatically regulating the amount of sensing fluid therein.

Co-pending U.S. Application Ser. No. 09/003,850, hereinafter "Application ASL-193-US", entitled "Altitude/Temperature Compensation for a Gas-Filled Weight Sensor", filed on Jan. 7, 1998 claiming benefit of U.S. Provisional Application Ser. No. 60/065,334 filed on Nov. 13, 1997, and assigned to the assignee of the instant invention discloses a hydrostatic weight sensor comprising a pair of hydrostatic weight sensors in series with one another but having a different sensitivity with respect to variations in temperature or ambient pressure.

Co-pending U.S. Application Ser. No. 09/003,744, hereinafter "Application ASL-195-US", entitled "Low Profile Hydraulic Seat Weight Sensor", filed on Jan. 7, 1998 claiming benefit of U.S. Provisional Application Ser. No. 60/065,832 filed on Nov. 17, 1997, and assigned to the assignee of the instant invention discloses a hydrostatic weight sensor constructed from constructed from plates or sheets of semi-rigid material and filled with a liquid, grease, Bingham fluid or thixotropic material.

TECHNICAL ART

The instant invention generally relates to sensors and systems for measuring weight and more particularly to a weight sensor for measuring the weight of occupants and other objects in a motor vehicle seat such as useful for determining occupant seating conditions for controlling a vehicle safety restraint system.

BACKGROUND OF THE INVENTION

A vehicle may contain automatic safety restraint actuators which are activated responsive to a vehicle crash for purposes of mitigating occupant injury. Examples of such restraint actuators include air bags, seat belt pretensioners, and deployable knee bolsters.

One objective of an automatic safety restraint system is to mitigate occupant injury, thereby not causing more injury with the automatic restraint system than would be caused by the crash had the automatic restraint system not been activated. Notwithstanding the protective benefit of these automatic safety restraint actuators, there is generally both a risk and a cost associated with the deployment thereof. Generally, it is desirable to only activate automatic safety restraint actuators when needed to mitigate injury because of the expense of replacing the associated components of the safety restraint system, and because of the potential for such activations to harm occupants. This is particularly true of air bag restraint systems, wherein occupants too close to the air bag at the time of deployment—i.e. out-of-position occupants—are vulnerable to injury or death from the deploying air bag even when the associated vehicle crash is relatively mild. Moreover, occupants who are of small stature or with weak constitution, such as children, small adults or people with frail ones are particularly vulnerable to injury induced by the air bag inflator. Furthermore, infants properly secured in a normally positioned rear facing infant seat (RFIS) in proximity to a front seat passenger-side air bag are also vulnerable to injury or death from the deploying air bag because of the close proximity of the infant seat's rear surface to the air bag inflator module.

While air bags are designed to protect vehicle occupants, conventional crash detection and safety restraint deployment systems only use sensors which are mounted on the vehicle frame and are triggered by acceleration or velocity of the car rather than the occupant. Accordingly, conventional deployment strategies are not directly based on the weight, stature, and position of vehicle occupants. It is often very difficult to discriminate between crashes where air bags should be deployed and when their deployment could cause more harm than benefit. This difficult decision is typically made using only one or as few as possible sensors mounted on the vehicle. In the future, more occupant safety strategies will be available, including seat belt pre-tensioning and multi-stage air bags. With more available options, the deployment decision will become more complicated and require additional real-time occupant position data.

Air bag inflators are designed with a given restraint capacity, as for example, the capacity to protect an unbelted normally seated fiftieth percentile occupant when subjected to a 30 MPH barrier equivalent crash, which results in associated energy and power levels which can be injurious to out-of-position occupants. While relatively infrequent, cases of injury or death caused by air bag inflators in crashes for which the occupants would have otherwise survived relatively unharmed have provided the impetus to reduce or eliminate the potential for air bag inflators to injure the occupants which they are intended to protect.

One technique for mitigating injury to occupants by the air bag inflator is to reduce the power and energy levels of the associated air bag inflator, for example by reducing the amount of gas generant in the air bag inflator, or the inflation rate thereof. This reduces the risk of harm to occupants by the air bag inflator while simultaneously reducing the restraint capacity of the air bag inflator, which places occupants a greater risk for injury when exposed to higher severity crashes.

Another technique for mitigating injury to occupants by the air bag inflator is to control the rate of inflation rate or the capacity of the inflator responsive to a measure of the severity of the crash. However, the risk of injury to such occupants would not be mitigated under the conditions of higher crash severity when the inflator is intentionally made aggressive in order to provide sufficient restraint for normally positioned occupants.

Yet another technique for mitigating injury to occupants by the air bag inflator is to control the activation of the air bag inflator responsive to the presence, position, and size of the occupant, or to the severity of the crash. For example, the air bag inflator can be disabled if the occupant weight is below a given threshold. Moreover, the inflation capacity can be adjusted by controlling the number of inflation stages of a multi-stage inflator that are activated. Furthermore, the inflation power can be adjusted by controlling the time delay between the firings of respective stages of a multi-stage inflator.

One measure of restraint capacity of an air bag inflator is the amount of occupant kinetic energy that can be absorbed by the associated air bag system, whereby when the occupant collides with the gas filled air bag, the kinetic energy of the occupant is converted to potential energy via the pressurization of the air bag, and this potential energy is dissipated by venting pressurized gases from the air bag. As a vehicle in a crash is decelerated, the velocity of an unrestrained occupant relative to the vehicle increases. Preferably, the occupant restraint process is commenced early in the crash event so as to limit the amount of occupant kinetic energy which must be absorbed and thereby minimize the associated restraint forces and accelerations of and loads within the occupant. If the occupant were a simple inertial mass without friction relative to the vehicle, the kinetic energy of the occupant would be given by $\frac{1}{2} M \cdot V^2$, where M is the mass of the occupant and V is the occupant velocity relative to the vehicle. If a real occupant were represented by an interconnected set of bodies, some of which have friction relative to the vehicle, each body of which may have differing velocities relative the vehicle, the above equation would apply to the motion of the center of gravity of the occupant. Regardless of the representation, occupants of larger mass will have a larger kinetic energy for the same velocity relative to the vehicle. Therefore, an occupant weight sensor is useful in an air bag system with variable restraint capacity to enable the restraint capacity to be preferentially adapted to the weight, or mass, of the occupant.

Except for some cases of oblique or side-impact crashes, it is generally desirable to not activate an automatic safety restraint actuator if an associated occupant is not present because of the otherwise unnecessary costs and inconveniences associated with the replacement of a deployed air bag inflation system. Occupant presence can be detected by a seat weight sensor adapted to provide either a continuous measure of occupant weight or to provide a binary indication if the occupant weight is either above or below a specified weight threshold.

Known seat weight sensors comprise one or more pads employing force sensitive resistive (FSR) films. These arrangements are typically used as weight threshold systems to disable a passenger air bag when the seat is empty. Load cells attached to the seat mounting posts have also been used in research applications. Mechanisms which use string based potentiometers to measure downward seat displacement have also been investigated.

Such known arrangements suffer from several drawbacks. First, variable resistance force sensors have limited sensitivity and in some situations are not sensitive enough to put directly under a seat pad while still achieving the desired response. Second, the threshold weight system provides only very limited information. For example, such arrangements provide no indication as to the size of an occupant. Third, the resistance values of known variable force resistor change with temperature, and are subject to drift over time with a constant load on the sensor.

Furthermore, other known sensing arrangements do not otherwise provide suitable results. For example, the use of load cells is prohibitively expensive for large-scale commercial applications. Strain gauges of any type may be impractical because of the difficulty in applying them to the strained material. Mechanical string potentiometer based weight sensors are complex, and subject to failure from stretching of the string. String potentiometer based weight sensors also suffer from a limitation whereby seat geometry changes over the lifetime of the seat. More specifically, seats tend to take a "set" over time so that the springs and cushion tend to move downward as the seat ages. A string potentiometer based weight sensor measuring downward displacement would require periodic recalibration over the lifetime of the seat. Finally, optical or infrared sensors have been used to measure the spatial position of occupants relative to the dashboard or headliner. Often these sensors are also integrated with speed sensors to discern changes in occupant position due to car acceleration. Current optical and infrared occupant position sensors require augmented information from speed and weight sensors, thereby resulting in a relatively high cost distributed system which may be difficult to manufacture, install, and maintain. Furthermore, optical and/or infrared sensors which measure the range from the headliner or dashboard can be confused by placement of objects in front of an occupant, such as when reading newspapers or books, or by the position of the seat back because many seats can recline fully back and incline fully forward. Moreover, the sensing aperture of these sensors may become occluded by inadvertent scratching or substance application.

Known seat weight sensing techniques generally require multiple points for sensing distributed weight accurately. Also, force sensing resistors, load cells or membrane switches may require significant seat redesign for use in current or future seats. This is particularly true for spring type seats which do not provide a uniform horizontal support surface. The response time of load cells or membrane switches may fast enough for real-time applications.

The prior art also teaches the use of seat weight sensors outside the automotive environment, for example as a means for disabling the activation of either a boat or an industrial machine if the operator is not properly seated, or for weighing a person seated on an exercise bike. These devices employ pneumatic bladders located in the seat, whereby the pressure within the bladder is used to either activate a threshold switch or to provide a continuous indication of occupant weight.

One problem with prior art pneumatic sensors, particularly when applied to the automotive environment, is their sensitivity to environmental conditions, particularly to ambient temperature and pressure. This requires the bladder to be partially filled with fluid under ambient conditions of lower temperature or higher pressure, thereby making the bladder more susceptible to bottoming out when exposed to localized or concentrated loads and therefor requiring a means for distributing the loads over the load bearing area of the bladder. Pneumatic seat weight sensors can be sensitive to the amount of air initially in the associated bladder. A seat weight sensor in an automotive environment must function reliably and accurately over a wide range of temperatures and pressures which can cause significant errors.

Another problem with a pneumatic seat weight sensor is that the sensor bladder must be sufficiently thick to prevent the top and bottom surfaces of the bladder from compressing against one another responsive to a sufficiently great localized or concentrated load under conditions when the bladder has a relatively small amount of gas, such as would occur when the bladder is filled at low pressure or high temperature.

Yet another problem with a pneumatic seat weight sensor is that a gas filled bladder is also prone to loss of fluid by leakage or osmosis, which necessitates a means for replenishing the working fluid of the bladder over the life of operation.

The prior art also teaches the use of hydraulic load cells, wherein the weight to be measured acts upon a piston element of known area, whereby the measured weight is found by multiplying a measured pressure times the known area. One problem with hydraulic load cells in the automotive environment, particularly in a seat, is that the effects of load cell orientation on hydraulic head can introduce load measurement errors.

SUMMARY OF THE INVENTION

The instant invention overcomes the above noted problems by providing a low profile hydrostatic weight sensor incorporates a continuous length of compressible tubing as a sensing tube. The sensing tube is sealed at one end and connected to a pressure sensor at the other end, and is formed in a zigzagged or serpentine path, or coiled, such that the contour of the resulting pattern substantially matches the projected contour of the seat base so that most of the weight supported by the seat is transferred to the sensing tube.

The sensing tube is filled with a sensing fluid which can be either liquid (including gels and greases) or gaseous, but is preferably a liquid, for example a silicone based fluid, with relatively high viscosity so as to dampen pressure fluctuations which occur during the operation of the associated vehicle.

The above described sensing tube is embedded within the seat, preferably below the seat cushion and above a load distributing element on the seat springs. In operation, a load applied to the seat is transferred to the top of the sensing tube via the seat cushion and reacted by the load distributing element against the bottom of the sensing tube, thereby compressing the sensing tube and causing a volume reducing distortion thereof thereby compressing the sensing fluid therein. The pressure of the sensing fluid transfers the load from the top half of the sensing tube to the bottom half thereof. Therefore, assuming that the arrangement of the sensing tube within the seat is such that all of the load on the seat is supported by the sensing tube, then the magnitude of the applied load is substantially given by the product of the sensor fluid pressure times the projected area of the bottom half of the sensing tube.

By incorporating a distributed sensing tube filled with a relatively incompressible fluid the instant invention is relatively unsusceptible to localized collapse, that could otherwise create an alternate load path to which the pressure of the sensing fluid would not be responsive. Moreover, the instant invention does not require a means for automatically maintaining the sensing tube in a partially filled state because the sensing fluid is relatively incompressible, relatively viscous, and relatively insensitive to temperature and ambient pressure variations. Furthermore, the instant invention is less susceptible to leakage because the sensing fluid is relatively viscous. Furthermore, by incorporating a sensing fluid which is relatively incompressible and relatively insensitive to temperature and ambient pressure variations, the instant invention can be constructed with a relatively low profile since only a relatively small volume of sensing fluid is required.

In accordance with the instant invention, a load distributor comprises a means for distributing the load applied to a hydrostatic weight sensor across one or more load bearing surfaces of the hydrostatic weight sensor. A hydrostatic weight sensor is preferably partially filled with fluid, particularly for fluids such as gases that are subject to expansion under the influence of ambient temperature and pressure conditions. A partially filled hydrostatic weight sensor is susceptible to bottoming out under the influence of concentrated loads unless a means is provided for distributing the applied load across the load bearing surfaces of the hydrostatic weight sensor. The seat cushion inherently acts as a load distributor but is subject to localized deformation under the influence of loads that are sufficiently great or sufficiently concentrated. A load distributor preferably is both sufficiently rigid to prevent concentrated loads from causing localized deformations of sufficient magnitude to locally collapse the hydrostatic weight sensor, and sufficiently flexible so as to not interfere with seating comfort. Examples of various load distributors in accordance with the instant invention are disclosed in Applications ASL-157 and ASL-186 referenced hereinabove and incorporated herein by reference The instant invention provides a hydrostatic weight sensor which can be constructed relatively inexpensively and ruggedly from compressible tubing, for example surgical tubing. The cross-sectional shape of the sensing tube is not limiting to the instant invention, and for example could be either round, elliptical, or substantially rectangular in shape. The zigzag, serpentine or coiled pattern of the sensing tube could be established and maintained either with a separate framework or by adhesively bonding the sensing tube to either the seat cushion or the associated load distributing element.

Accordingly, one object of the instant invention is to provide an improved hydrostatic weight sensor that provides a consistent and accurate measure of the seat loading independent of the location of the source of weight on the seat.

A further object of the instant invention is to provide an improved hydrostatic weight sensor that provides a consistent and accurate measure of the seat loading independent of the size and distribution of the source of weight on the seat.

A yet further object of the instant invention is to provide an improved hydrostatic weight sensor that provides a consistent and accurate measure of the seat loading independent of the amount of weight on the seat.

A yet further object of the instant invention is to provide an improved hydrostatic weight sensor that operates over a wide range of ambient temperature and pressure conditions.

A yet further object of the instant invention is to provide an improved hydrostatic weight sensor that can distinguish between a rear facing infant seat, for which an air bag system is preferably not deployed, and other occupants for which an air bag system is preferably deployed in the event of a crash of sufficient severity.

A yet further object of the instant invention is to provide an improved hydrostatic weight sensor that can be incorporated into an intelligent safety restraint system for which the preferable mode of the activation of a controllable occupant restraint system is dependent upon the weight of the occupant.

A yet further object of the instant invention is to provide an improved hydrostatic weight sensor that does not interfere with occupant comfort.

A yet further object of the instant invention is to provide an improved hydrostatic weight sensor that is inexpensive to produce.

In accordance with these objectives, one feature of the instant invention is a low profile hydrostatic weight sensor, incorporating a fluid-filled sensing tube, mounted in the seat.

Another feature of the instant invention is a pressure sensor operatively coupled to the fluid-filled sensing tube for measuring the pressure therein.

Yet another feature of the instant invention is a differential pressure sensor operatively coupled to the fluid-filled sensing tube for measuring the pressure therein relative to local atmospheric pressure.

Yet another feature of the instant invention is the incorporation of the fluid-filled sensing tube below the seat cushion wherein the seat cushion acts to distribute the seat load on the sensing tube.

Yet another feature of the instant invention is the incorporation of the fluid-filled sensing tube above a load distributing element to distribute the reaction load across the surface of the hydrostatic weight sensor.

Yet another feature of the instant invention is the incorporation of a liquid as the sensing fluid.

The specific features of the instant invention provide a number of associated advantages. One advantage of the instant invention with respect to the prior art is that the fluid-filled sensing tube is responsive to loads over a large area of the seat without regards to the distribution or amount of loading.

Another advantage of the instant invention is that the hydrostatic weight sensor is relatively insensitive to variations in ambient pressure or temperature so that the hydrostatic weight sensor works consistently and accurately over a wide range of ambient pressures and temperatures.

Yet another advantage of the instant invention is that the hydrostatic weight sensor thereof is relatively inexpensive to produce.

Yet another advantage of the instant invention is that the hydrostatic weight sensor thereof can enable a rear facing infant seat to be distinguished from an occupant for which the air bag system is preferably deployed.

Yet another advantage of the instant invention is that the hydrostatic weight sensor thereof is sufficiently robust and accurate to enable associated occupant weight dependent control of a controllable occupant restraint system.

Accordingly, the instant invention provides an improved hydrostatic weight sensor which is relatively insensitive to the effects of ambient temperature and pressure; which is simple to construct and relatively robust and reliable in operation; which has a low physical profile and which can be readily incorporated into an automotive seat without interfering with occupant comfort; and which can be produced relatively inexpensively.

These and other objects, features and advantages of the instant invention will be more fully understood after reading the following detailed description of the preferred embodiment with reference to the accompanying drawings. While this description will illustrate the application of the instant invention in an automotive safety restraint system, it will be understood by one with ordinary skill in the art that the instant invention can also be applied to other systems for weighing objects.

BRIEF DESCRIPTION OF THE DRAWINGS

FIG. 4b is a cross-sectional view of the instant invention illustrating an unloaded sensing tube having an elliptical cross-section, and illustrating a deformed shape subject to loading of an sensing tube having an unloaded circular cross-section in accordance with FIG. 4a.

DETAILED DESCRIPTION OF THE PREFERRED EMBODIMENT(S)

Figure 1:
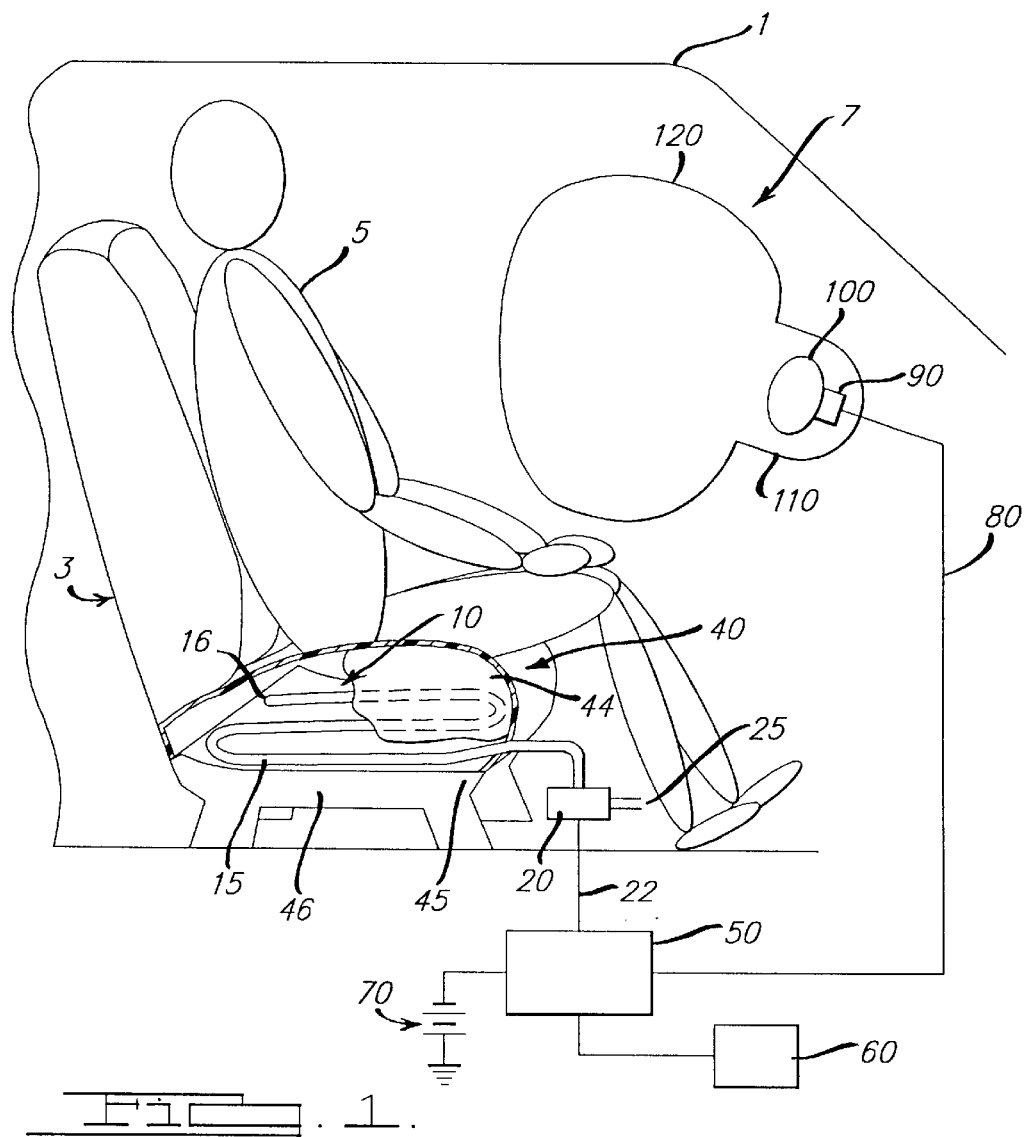
FIG. 1 illustrates one possible environment of the instant invention.

Referring to FIG. 1, a seat 3 in a motor vehicle 1 incorporates a hydrostatic weight sensor 10 mounted in the seat base 40. The hydrostatic weight sensor 10 comprises a fluid-filled sensing tube 15 formed from a continuous length of compressible tubing sealed at one end 16, and a differential pressure sensor 20 attached to the other end for measuring the difference in pressure between the sensing fluid 13 in the sensing tube 15 and the atmosphere 25. The sensing tube 15 is sandwiched between a load distributing element 45 below and the seat cushion foam 44 above, whereby the load distributing element 45 is located above the seat springs contained in the seat frame 46.

In operation, an occupant 5 seated on the base 40 of seat 3 causes the pressure of the sensing fluid 13 inside the sensing tube 15 to increase such that that product of the differential pressure, as sensed by differential pressure sensor 20, multiplied times the projected area of the sensing tube 15 is equal to the total weight distributed by the seat cushion foam 44 over the sensing tube 15. The pressure signal output 22 from differential pressure sensor 20 is operatively coupled to a signal processor 50 which converts the pressure signal output 22 to a measure of occupant weight using known analog, digital, or microprocessor circuitry and software. A crash sensor 60 is also operatively coupled to the signal processor 50. Responsive to a crash detected by the crash sensor 60, and further responsive to the sensed weight of the occupant as transformed from the pressure signal output 22, the signal processor 50 generates a signal 80 which is operatively coupled to one or more initiators 90 of one or more gas generators 100 mounted in an air bag inflator module 110, thereby controlling the activation of the air bag inflator module assembly 7 so as to inflate the air bag 120 as necessary to protect the occupant 5 from injury which might otherwise be caused by the crash. The electrical power necessary to carry out these operations is provided by a source of power 70, preferably the vehicle battery.

Figure 2:
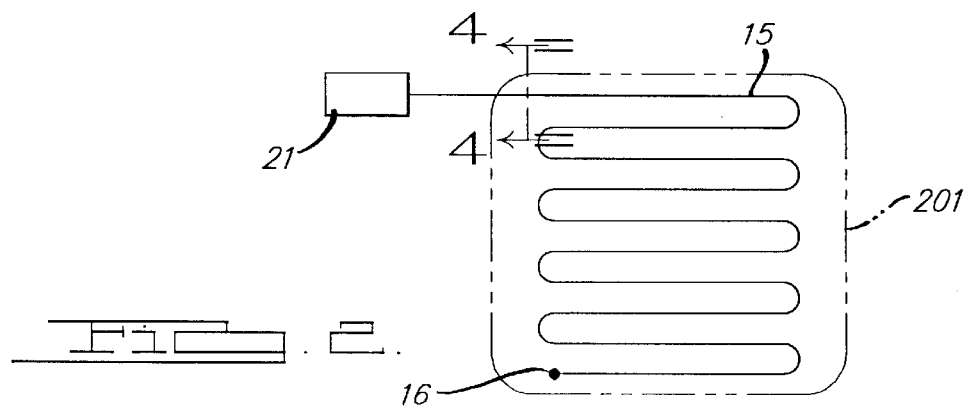
FIG. 2 illustrates a plan view of the instant invention incorporating a sensing tube having a zigzag or serpentine path.
Figure 3:
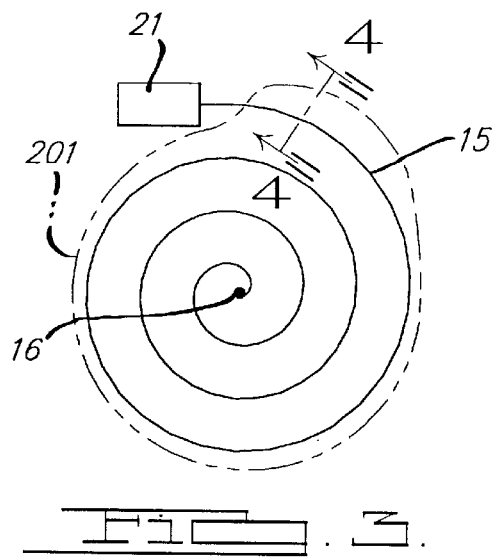
FIG. 3 illustrates a plan view of the instant invention incorporating a sensing tube having a coiled path.
Figure 5:
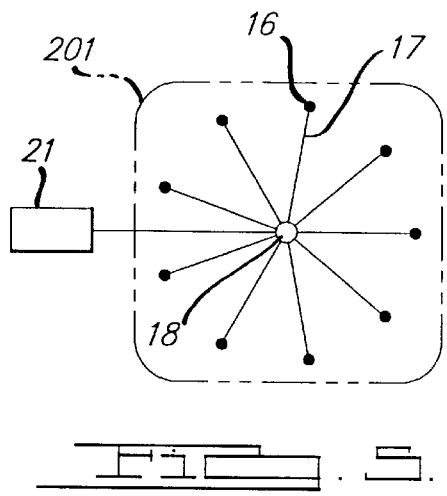
FIG. 5 illustrates a plan view of the instant invention incorporating a sensing tube comprising a plurality of segments, each of which is in fluid communication with a central port.

The sensing tube 15 comprises a continuous length of compressible tubing which is formed in a zigzagged or serpentine path as illustrated in FIG. 2, or coiled as illustrated in FIG. 3. One end 16 of the sensing tube 15 is sealed, and the other end is connected to a pressure sensor 21, which preferably measures the difference in pressure across the sensing tube 15. As illustrated in FIG. 5, the sensing tube 15 may also comprise a plurality of segments 17, each of which is in fluid communication with a central port 18, to which a pressure sensor is also operatively connected. The distal ends 16 of each of the segments 17 are sealed. The contour 201 of the sensing tube 15 pattern substantially matches the projected contour of the seat cushion foam 44 so that most of the weight supported by the seat is transferred to the sensing tube 15. The zigzag, serpentine or coiled pattern of the sensing tube is established and maintained either with a separate framework or by adhesively bonding the sensing tube 15 to either the underside of the seat cushion foam 44 or on top of the associated load distributing element 45.

Figure 4A:
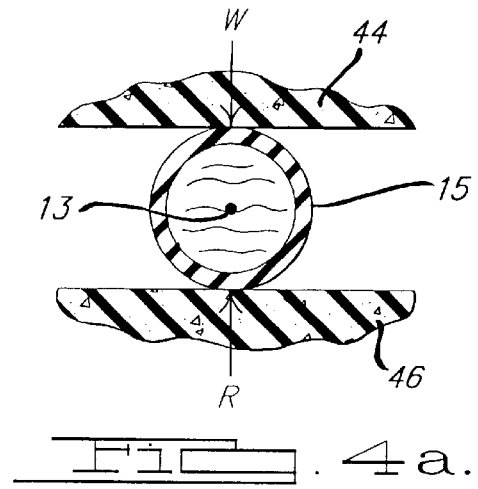
FIG. 4a is a cross-sectional view of the instant invention illustrating an unloaded sensing tube having a circular cross-section.
Figure 4B:
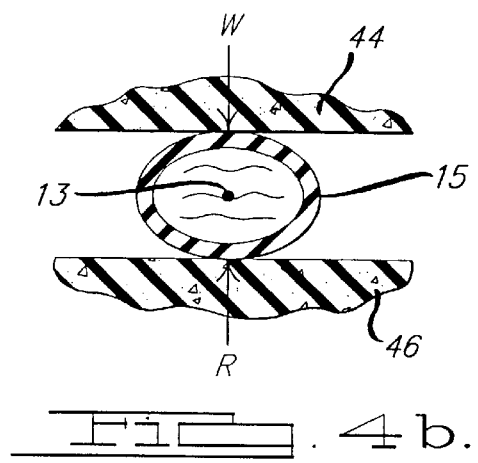
Figure 4C:
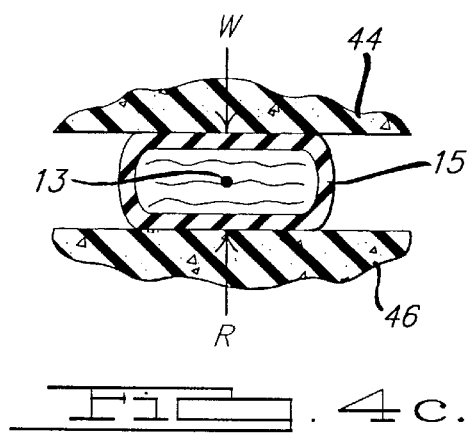
FIG. 4c is a cross-sectional view of the instant invention illustrating an unloaded sensing tube having a rectangular cross-section.

The sensing tube 15 is constructed from relatively compressible tubing, for example surgical tubing. The cross-sectional shape of the sensing tube is not limiting to the instant invention, and for example could be either round, elliptical, or substantially rectangular in shape as illustrated in FIGS. 4a, 4b and 4c respectively. A load W is applied by the seat cushion foam 44 to the sensing tube 15 and reacted by reaction force R from the load distributing element 45 thereby compressing the sensing tube causing a volume reducing distortion thereof thereby compressing the sensing fluid 13 therein. In addition to illustrating the cross-section of one embodiment of an unloaded sensing tube 15, FIG. 4b also illustrates the deformation under load W of a sensing tube 15 having an initial circular cross section in accordance with FIG. 4a. The pressure of the sensing fluid 13 transfers the load from the top half of the sensing tube to the bottom half thereof. Therefore, assuming that the arrangement of the sensing tube 15 within the seat base 40 is such that all of the load on the seat base 40 is supported by the sensing tube 15, then the magnitude of the applied load is substantially given by the product of the pressure of the sensing fluid 13 times the projected area of the bottom half of the sensing tube 15.

The sensing fluid 13 can be either liquid or gaseous, but is preferably a liquid, (including fluids such as gels or greases with liquid-like properties) for example a silicone based fluid, with relatively high viscosity so as to dampen pressure fluctuations which occur during the operation of the associated vehicle.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

I claim:

1. A sensor for sensing the weight of an occupant on a vehicle seat, comprising:

a. a continuous flexible sensing tube mounted beneath the cushion of the seat and supported by the base of the seat;

b. a fluid contained by said flexible sensing tube, whereby said flexible sensing tube is sealed;

c. a pressure sensor operatively coupled to said flexible sensing tube for generating a signal responsive to the pressure of said fluid within said flexible sensing tube; and d. a signal processor for calculating the weight of the occupant from said signal.

2. A sensor for sensing the weight of an occupant on a vehicle seat as recited in claim 1, whereby said flexible sensing tube comprises a spiral pattern.

3. A sensor for sensing the weight of an occupant on a vehicle seat as recited in claim 1, whereby said flexible sensing tube comprises a serpentine pattern.

4. A sensor for sensing the weight of an occupant on a vehicle seat as recited in claim 1, whereby said flexible sensing tube comprises a plurality of segments each of which is in fluid communication with a central port, whereby said pressure sensor is operatively connected to said central port.

5. A sensor for sensing the weight of an occupant on a vehicle seat as recited in claim 1, whereby said fluid is a liquid.

6. A sensor for sensing the weight of an occupant on a vehicle seat as recited in claim 1, further comprising a load distributor adjacent at least one of the load bearing surfaces of said flexible sensing tube.

7. A sensor for sensing the weight of an occupant on a vehicle seat as recited in claim 1, whereby for substantially no external load applied to said fluid filled bladder the volume of said fluid within said flexible sensing tube is less than the capacity of said flexible sensing tube.

8. A sensor for sensing the weight of an occupant on a vehicle seat as recited in claim 1, wherein said pressure sensor is responsive to the differential pressure of said fluid within said flexible sensing tube relative to local atmospheric pressure.

9. A sensor for sensing the weight of an occupant on a vehicle seat as recited in claim 1, wherein said pressure sensor is responsive to the strain in the surface of said flexible sensing tube.

10. A sensor for sensing the weight of an occupant on a vehicle seat as recited in claim 1, wherein said pressure sensor is isolated from said fluid by the wall of said flexible sensing tube.

11. A system for sensing the weight of an occupant on a vehicle seat and for controlling a safety restraint system responsive thereto, comprising:

a. a continuous flexible sensing tube mounted beneath the cushion of the seat and supported by the base of the seat;

b. a fluid contained by said flexible sensing tube, whereby said flexible sensing tube is sealed;

c. a pressure sensor operatively coupled to said flexible sensing tube for generating a signal responsive to the pressure of said fluid within said flexible sensing tube; and d. a signal processor for calculating the weight of the occupant from said signal for generating a control signal for controlling the safety restraint system responsive to said weight measurement.

12. A system for sensing the weight of an occupant on a vehicle seat and for controlling a safety restraint system responsive thereto as recited in claim 11, whereby said fluid is a liquid.

13. A system for sensing the weight of an occupant on a vehicle seat and for controlling a safety restraint system responsive thereto as recited in claim 11, further comprising a load distributor adjacent at least one of the load bearing surfaces of said flexible sensing tube.

14. A method of sensing the weight of an occupant on a vehicle seat, comprising:

a. interposing a flexible sensing tube in series with the load path supporting the occupant on the vehicle seat;

b. partially filling said flexible sensing tube with a fluid;

c. containing said fluid within said flexible sensing tube;

d. generating a signal responsive to the pressure of said fluid within said flexible sensing tube; and e. generating a measure responsive to the weight of the occupant from said signal.

15. A method of sensing the weight of an occupant on a vehicle seat as recited in claim 14, further comprising the operation of distributing the weight of the occupant across the load bearing surface of said flexible sensing tube.

\* \* \* \* \*